(12) United States Patent
Hoashi (10) Patent No.: US 7,242,461 B2
(45) Date of Patent: Jul. 10, 2007

(54) VEHICULAR RADAR SYSTEM

(75) Inventor: Yoshiaki Hoashi, Kariya (JP)

(73) Assignee: DENSO Corporation, Kariya (JP)

( * ) Notice: Subject to any disclaimer, the term of this patent is extended or adjusted under 35 U.S.C. 154(b) by 108 days.

(21) Appl. No.: 11/237,105

(22) Filed: Sep. 28, 2005

(65) Prior Publication Data

US 2006/0072099 A1    Apr. 6, 2006

(30) Foreign Application Priority Data

Oct. 1, 2004    (JP) .............................. 2004-290483

(51) Int. Cl.
*G01C 3/08*    (2006.01)
(52) U.S. Cl. ..................... 356/4.07; 356/4.01
(58) Field of Classification Search ............... 356/4.01, 356/4.07, 5.01, 5.1, 28; 342/70–72
See application file for complete search history.

(56) References Cited

U.S. PATENT DOCUMENTS 3,417,393 A * 12/1968 Cooke et al. ............... 342/157
5,565,870 A * 10/1996 Fukuhara et al. ............. 342/70
6,204,755 B1 * 3/2001 Kikuchi ....................... 340/435
6,307,622 B1 * 10/2001 Lewis ......................... 356/4.01
6,759,983 B2 * 7/2004 Eden ........................... 342/451
2003/0085834 A1 * 5/2003 Okamura ..................... 342/70
2004/0169840 A1    9/2004 Hoashi et al.
2006/0022866 A1 * 2/2006 Walton et al. ............... 342/194

* cited by examiner

*Primary Examiner*—Thomas H. Tarcza
*Assistant Examiner*—Isam Alsomiri
(74) *Attorney, Agent, or Firm*—Harness, Dickey & Pierce, PLC (57) ABSTRACT

An integrator of a vehicular radar system has multiple switches and multiple capacitors, which are connected with the switches, for each one of photoreceptive elements. The integrator integrates light reception signals, which are output from the photoreceptive elements, by switching the switches to a connected state one after another in a predetermined order at a predetermined time interval until a predetermined time passes after every emission of the laser light and by switching the switches to the connected state one after another in a predetermined order at a predetermined time interval if the laser light is emitted predetermined times. Thus, the integrator can integrate the light reception signals, which are output from the multiple photoreceptive elements, in parallel.

8 Claims, 7 Drawing Sheets

PHOTORECEPTOR (PD1-PD16)

| NOISE TYPE | NOISE ORIGIN | WAVEFORM EXAMPLE |
|---|---|---|
| BACKGROUND NOISE | · THERMAL NOISE<br>· SHOT NOISE<br>  (=RANDOM NOISES) | NORMAL DISTRIBUTION |
| BASE NOISE | · LARGE CURRENT AT LIGHT EMISSION<br>· CLOCK NOISE<br>· POWER SOURCE NOISE | |

VEHICULAR RADAR SYSTEM

CROSS REFERENCE TO RELATED APPLICATION

This application is based on and incorporates herein by reference Japanese Patent Application No. 2004-290483 filed on Oct. 1, 2004.

BACKGROUND OF THE INVENTION

1. Field of the Invention

The present invention relates to a vehicular radar system.

2. Description of Related Art

JP-A-2004-177350 describes a vehicular radar system having a light emitter for emitting a laser light and a photoreceptor for receiving a reflected light of the laser light. The vehicular radar system is attempting to improve detection sensitivity of the reflected light reflected by a reflection object.

The light emitter of the vehicular radar system generates the laser light with a laser diode and changes an emission direction of the laser light with a polygon mirror that is driven to rotate. Thus, the light emitter performs scanning over a predetermined angular range for each predetermined minute angle with the laser light. If the laser light is reflected by the reflection object, the photoreceptor receives the reflected light with a light receiving lens. The received light is introduced to photoreceptive elements. The photoreceptive elements output voltage signals corresponding to intensity of the received light.

The vehicular radar system integrates a predetermined number of light reception signals, which are output based on a predetermined number of laser lights emitted contiguously, and outputs an integration signal, while ensuring angular resolution of the laser light. Thus, a light reception signal component corresponding to the reflected light is amplified by integrating the predetermined number of the light reception signals, and detection sensitivity of the reflected light can be improved.

Another vehicular radar system has a light emitter for emitting a laser light over a predetermined angular range in one emission and a photoreceptor having photoreceptive elements of the number corresponding to necessary angular resolution. The photoreceptive elements are arranged into an array along a width direction of the vehicle. This vehicular radar system integrates light reception signals, which are output when the photoreceptive element repeatedly receives the light, for each photoreceptive element. Thus, this vehicular radar system attempts to improve the detection sensitivity of the reflected light.

Figure 11A:
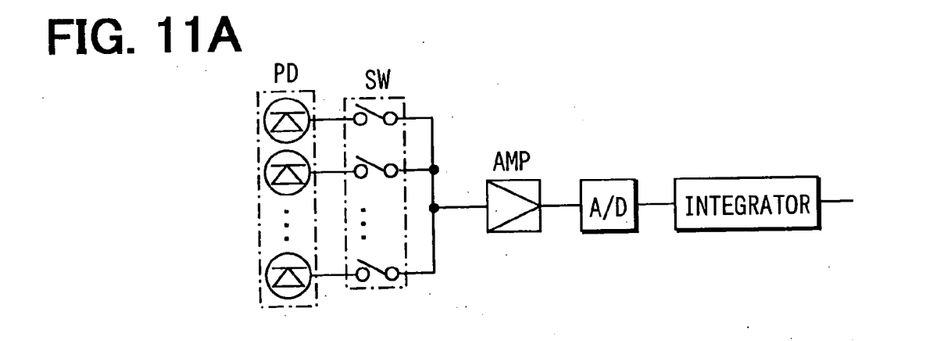
FIG. 11A is a schematic diagram showing a photo IC of a related art.

In such a case where the photoreceptor has multiple photoreceptive elements, usually, a structure shown in FIG. 11A having an integrator that integrates the light reception signals output by the photoreceptor is used.

The structure shown in FIG. 11A includes an amplification circuit (AMP), an A/D conversion circuit (A/D), an integrator, and switches (SW). The amplification circuit AMP amplifies the light reception signals output by the photoreceptive elements (PD) such as photo diodes. The A/D conversion circuit A/D converts the analog light reception signals into digital signals. The integrator integrates the digital light reception signals. The switch SW switches the output of the light reception signal output by each photoreceptive element PD. The amplification circuit AMP, the A/D conversion circuit A/D and the integrator are commonly used for the respective photoreceptive elements PD and switches SW.

The integration of the light reception signals is performed by switching each photoreceptive element PD. Therefore, the integration of the light reception signals output from the respective photoreceptive elements PD cannot be processed at the same time (in parallel). In such a case, the laser light needs to be emitted repeatedly for the time corresponding to the product of the number of the photoreceptive elements PD and the time of the integration. The laser diode will be degraded sooner as the time number of laser light emission increases.

Figure 11B:
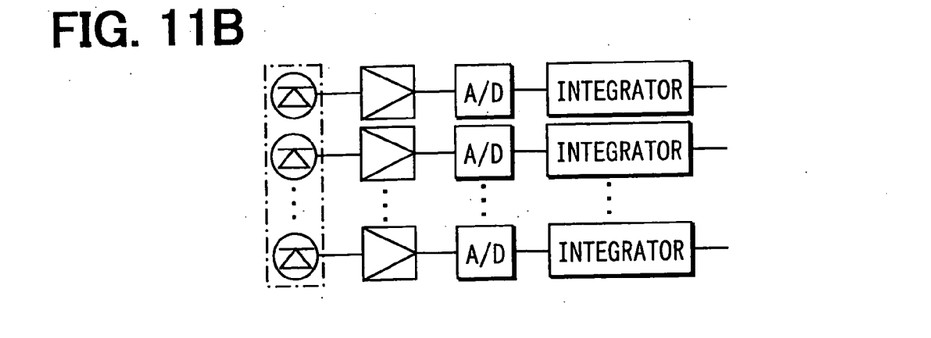
FIG. 11B is a schematic diagram showing a photo IC of another related art.

In order to overcome this problem, the amplification circuit AMP, the A/D conversion circuit A/D and the integrator may be disposed for each photoreceptive element PD, without employing the switches SW as shown in FIG. 11B. Thus, the integration of the light reception signals output from the respective photoreceptive elements PD can be performed in parallel, and the early degradation of the laser diode can be inhibited. However, the circuit structure becomes complicated.

SUMMARY OF THE INVENTION

It is therefore an object of the present invention to provide a vehicular radar system capable of performing integration of light reception signals output from multiple photoreceptive elements in parallel by using a simple circuit structure.

According to an aspect of the present invention, a radar system of a vehicle has a light emitter, a photoreceptor, an integrator, a controller, and a sensor. The light emitter repeatedly emits a laser light at least over a predetermined angular range along width direction of the vehicle in one light emission. The photoreceptor outputs light reception signals, which are output from photoreceptive elements arranged at least along the width direction of the vehicle. The integrator has multiple switches and multiple capacitors. The switches are provided for each photoreceptive element for switching connection with the photoreceptor. The capacitors are connected to the switches respectively for accumulating electric charges corresponding to intensity of the light reception signals. The controller switches the switches to a connected state one after another in a predetermined order at a predetermined time interval until a predetermined time passes after every emission of the laser light, while keeping the switch at a disconnected state when the switch is not switched to the connected state. The controller switches the switches to the connected state one after another in a predetermined order at a predetermined time interval if the laser light is emitted predetermined times in order to make the integrator output integration signals corresponding to electric charges accumulated in the capacitors. The sensor compares the integration signals of the respective photoreceptive elements output by the integrator with a predetermined integration standard value. The sensor senses a reflection object reflecting the laser light based on the integration signals equal to or greater than the integration standard value.

Thus, the radar system can perform the integration of the light reception signals, which are output by the multiple photoreceptive elements, in parallel.

The radar system integrates the light reception signals in an analog fashion by using the capacitors that accumulate electric charges in accordance with the intensity of the photoreceptive signals. Accordingly, the reflection object can be sensed at high sensitivity based on the integration signal corresponding to the electric charges corresponding to an amplified light reception signal component.

BRIEF DESCRIPTION OF THE DRAWINGS

Features and advantages of embodiments will be appreciated, as well as methods of operation and the function of the related parts, from a study of the following detailed description, the appended claims, and the drawings, all of which form a part of this application. In the drawings:

DETAILED DESCRIPTION OF THE REFERRED EMBODIMENTS

Figure 1:
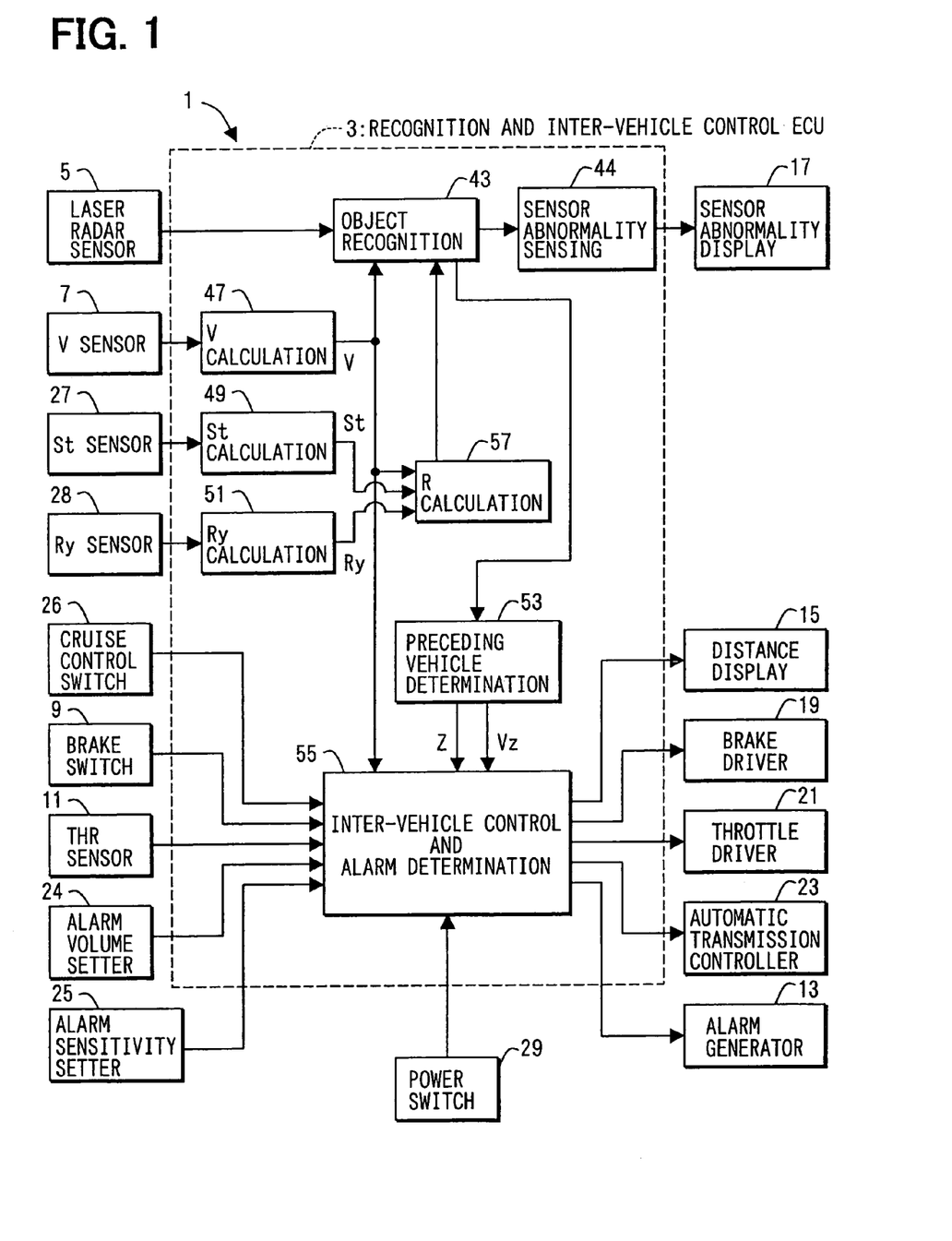
FIG. 1 is a block diagram showing a vehicle controller according to an example embodiment of the present invention.

Referring to FIG. 1, a vehicle controller 1 according to an example embodiment of the present invention is illustrated. The vehicle controller 1 is structured centering on a recognition and inter-vehicle control electronic control unit (ECU) 3. The ECU 3 includes a microcomputer, an input/output interface (I/O) and various drive circuits and detection circuits.

The ECU 3 receives detection signals from a laser radar sensor 5 as a vehicular radar system, a vehicle speed sensor 7, a brake switch 9, and a throttle opening degree sensor 11. The ECU 3 outputs drive signals to an alarm generator 13, a distance display 15, a sensor abnormality display 17, a brake driver 19, a throttle driver 21 and an automatic transmission controller 23.

The ECU 3 is connected with an alarm volume setter 24 for setting the volume of the alarm, an alarm sensitivity setter 25 for setting sensitivity of alarm determination processing, a cruise control switch 26, a steering sensor 27 for sensing a manipulation amount St of a steering wheel (not shown), and a yaw rate sensor 28 for sensing a yaw rate Ry caused in the vehicle. The ECU 3 has a power switch 29. If the power switch 29 is switched on, the ECU 3 starts predetermined processing.

Figure 2:
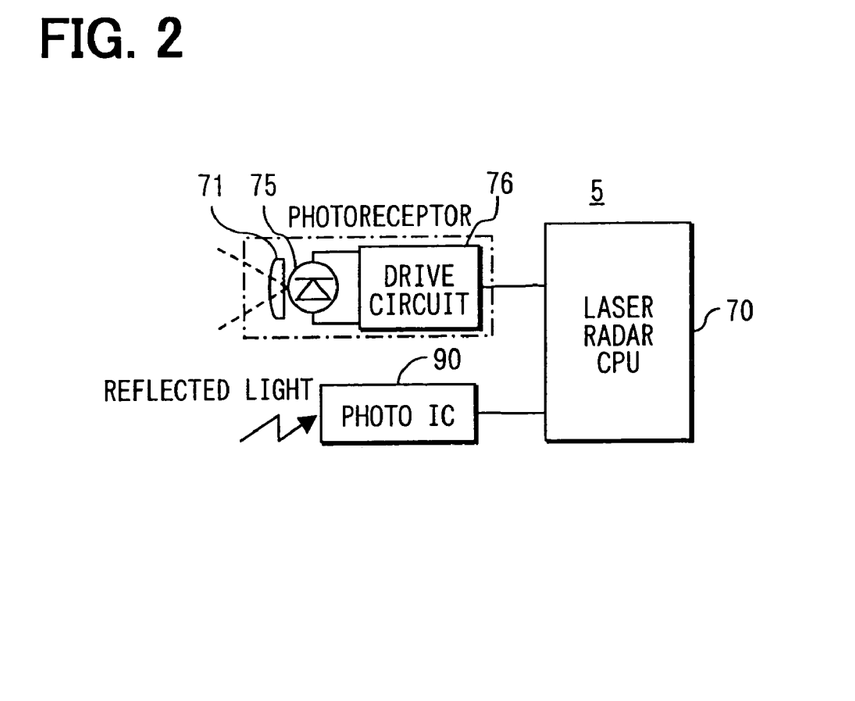
FIG. 2 is a schematic diagram showing a laser radar sensor according to FIG. 1 embodiment.

As shown in FIG. 2, the laser radar sensor 5 has a light emitter, a photo integrated circuit (photo IC) 90 including a photoreceptor, a laser radar CPU 70 and the like. The light emitter has a semiconductor laser diode 75 for emitting a pulse-shaped laser light through a light emission lens 71. The laser diode 75 is connected with the CPU 70 through a laser diode drive circuit 76, and emits the laser light responsive to a drive signal output by the CPU 70.

If a light-emitting direction of the light emitter is regarded as a virtual z-axis, the light emitter can emit the laser light over a predetermined area defined by predetermined angles along a virtual x-axis, i.e., a width direction of the vehicle perpendicular to the z-axis, and along a virtual y-axis, i.e., a height direction of the vehicle perpendicular to the z-axis, in one light emission. The light emitter emits the laser light repeatedly and intermittently. The light emitter does not scan the x-y plane defined by the x-axis and y-axis.

If the laser light is emitted over the predetermined area defined by the predetermined angles, the laser light is reflected by a reflection object, and the photoreceptor of the photo IC 90 receives the reflected light. Based on a light reception signal corresponding to the received light, the CPU 70 obtains reflection angles $\theta x$, $\theta y$ (lateral angle $\theta x$ and vertical angle $\theta y$) of the reflection object and a distance L from the reflection object. In this example embodiment, the lateral angle $\theta x$ is defined as an angle provided between the z-axis and a line produced by projecting the reflected light onto the x-z plane, and the vertical angle $\theta y$ is defined as an angle provided between the z-axis and a line produced by projecting the reflected light onto the y-z plane.

Figure 3:
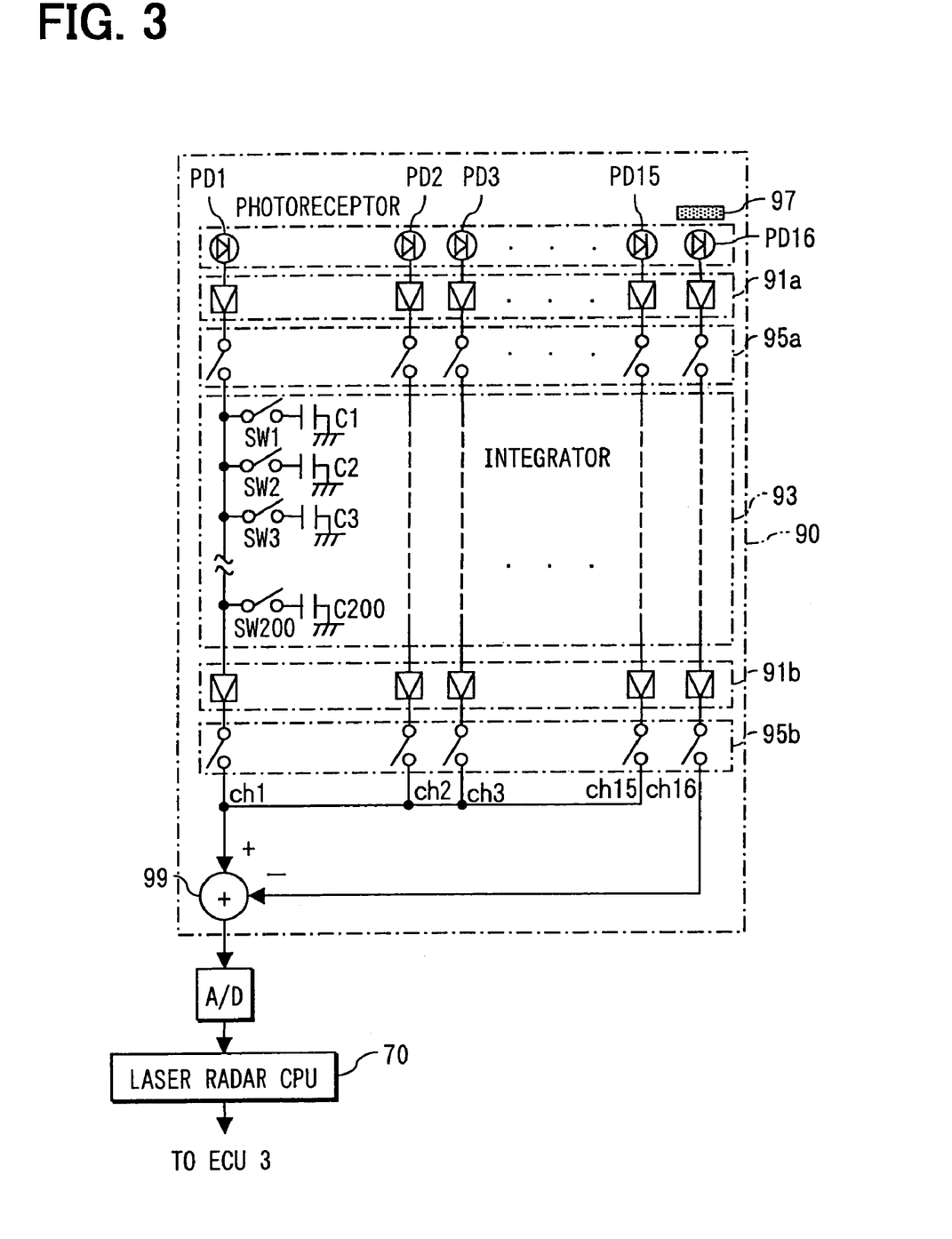
FIG. 3 is a schematic diagram showing a photo IC of the laser radar sensor according to FIG. 1 embodiment.

As shown in FIG. 3, the photo IC 90 has an integrator 93. The integrator 93 includes switches SW1–SW200 and capacitors C1–C200 respectively connected to the switches S1–S200 for each photodiode (photoreceptive element) PD. The integrator 93 integrates the light reception signals in an analog fashion.

Thus, unlike the conventional structure shown in FIG. 11B, it is unnecessary to prepare the A/D conversion circuit and the integrator for each photoreceptive element PD. Thus, the integration of the light reception signals output from the multiple photoreceptive elements PD1–PD16 can be performed in parallel by using a simple structure made up of the switches SW1–SW200 and the capacitors C1–C200.

Since the light reception signals output by the photoreceptive elements PD1–PD16 are integrated by the integrator 93 in the analog fashion, the detection sensitivity of the reflected light can be improved.

The photo IC 90 is structured by an integrated circuit (IC) as shown in FIG. 3. The photo IC 90 has a light reception lens 80 for gathering a laser light (reflected light) reflected by an reflection object, a photoreceptor for outputting the light reception signals, amplifiers 91a, 91b, the integrator 93, switching elements 95a, 95b, a light shield 97, a subtracter 99, and a controller (not shown).

The number (16, in this example embodiment) of the photoreceptive elements PD1–PD16 is set in accordance with angular resolution to be ensured. The photoreceptive elements PD1–PD16 are arranged in parallel into an array along the width direction (x-axis) of the vehicle. The photoreceptive elements PD1–PD16 output light reception signals corresponding to intensity of the laser light reflected by the reflection object. In addition to the photoreceptive elements PD1–PD16 arranged into the array along the width direction of the vehicle, another sixteen photoreceptive elements (not shown) are arranged in multiple rows along the y-axis perpendicular to the width direction of the vehicle. Thus, three-dimensional measurement can be performed.

The photoreceptor has the light shield 97 shielding at least one photoreceptive element (for example, the photoreceptive element PD16) from the light. Thus, a base noise component superimposed on the light reception signals of the photoreceptive elements PD1–PD15, which are not shielded by the light shield 97, can be eliminated based on the light reception signal output from the photoreceptive element PD16, which is shielded by the light shield 97.

The base noise and a background noise are superimposed on the light reception signals of the photoreceptive elements. The base noise is a noise generated by a large current when the light emitter generates the laser light, a clock noise generated in synchronization with a clock cycle of the CPU, or a power source noise generated by a power source. These noises are generated at predetermined intervals.

In this example embodiment, the photoreceptive element PD16 is shielded by the light shield 97, for example, such as an aluminum foil, from the light as shown in FIG. 3. The subtracter 99 subtracts an integration signal corresponding to the light reception signal of the photoreceptive element PD16 from the integration signal corresponding to the light reception signal of each one of the photoreceptive elements PD1–PD15. Thus, the base noise superimposed on the light reception signal of each one of the photoreceptive elements PD1–PD15 can be eliminated. Alternatively, the base noise may be eliminated in a digital fashion through internal processing of the CPU 70, without providing the subtracter 99.

The amplifiers 91a, 91b are provided for each photoreceptive element. The amplifiers 91a, 91b amplify input signals at predetermined ratios. The switching element 95a is provided for each photoreceptive element. The switching element 95a connects the photoreceptive element with the integrator 93 to output the light reception signal of the photoreceptive element to the integrator 93.

The switches SW1–SW200 are provided by complementary metal oxide semiconductors (CMOS), and operate responsive to switching command provided by the CPU 70. Alternatively, the switches SW1–SW200 may be provided by charge coupled devices (CCD).

Each one of the capacitors C1–C200 of the integrator 93 corresponding to the photoreceptive element PD16 has a buffer amplifier (not shown). The buffer amplifiers prevent loss of electric charges accumulated in the capacitors C1–C200.

Figure 5A:
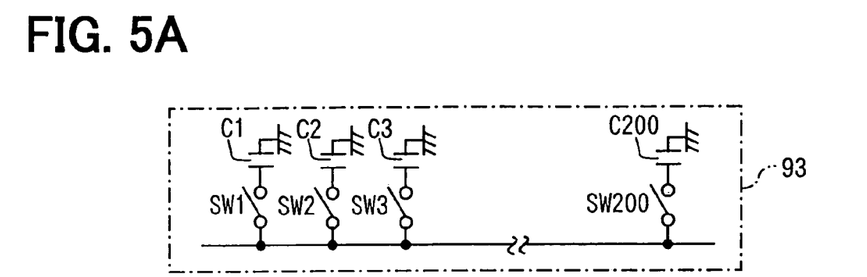
FIG. 5A is a schematic diagram showing an integrator according to FIG. 1 embodiment.

The controller controls operation of the integrator 93 and the switching elements 95a. The controller switches the switching elements 95a to a connected state and keeps the state continuously until the laser light is emitted predetermined times (for example, 256 times: n=256) as shown in FIG. 5D.

Each time the laser light is emitted, the controller performs the integration processing while a predetermined time (for example, 2000 nsec) passes after the laser light is emitted. In the integration processing, the switches SW1–SW200 are switched to the connected state one after another at a predetermined time interval (for example, 10 nsec) in a predetermined order to accumulate the electric charges respectively into the capacitors C1–C200 in accordance with the intensity of the light reception signals.

For instance, if the laser light is emitted for the first time (n=1), the switch SW1 is switched to the connected state immediately after the light emission, while the switches SW2–SW200 are kept at the disconnected state. When 10 nsec passes after that, the switch SW2 is switched to the connected state and the switch SW1 is switched to the disconnected state while the switches SW3–SW200 are kept at the disconnected state. Thus, the switching is repeated until each one of the switches SW1–SW200 is switched to the connected state once for each switch in that order (until 2000 nsec passes).

The switching of the switches SW1–SW200 to the connected state or the disconnected state is performed at the same time throughout the photoreceptive elements PD1–PD16. When one out of the switches SW1–SW200 is switched to the connected state, the other switches are kept at the disconnected state.

Figure 5B:
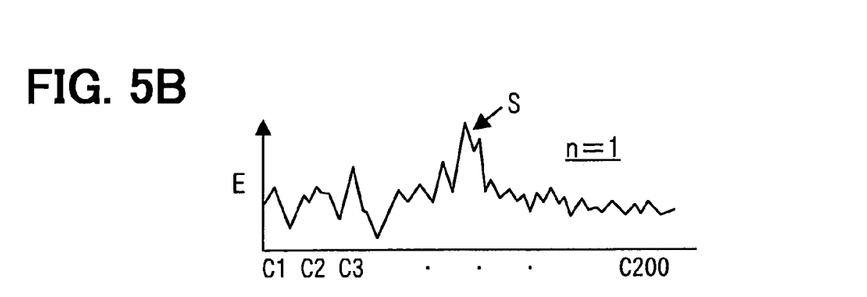
FIGS. 5B to 5D are graphs showing electric charges accumulated by capacitors according to FIG. 1 embodiment.

Thus, as shown in FIG. 5B, owing to the first emission of the laser light, the electric charge E is accumulated in each one of the capacitors C1–C200 in accordance with the intensity of the light reception signals at the time when the corresponding one of the switches SW1–SW200 is switched on. The electric charges E accumulated in the capacitors C1–C200 show the same result as the case where the light reception signal output from the photoreceptive element is sensed every 10 nsec.

Figure 5C:
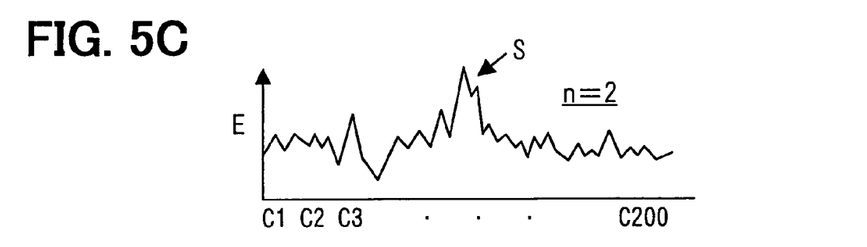
Figure 5D:
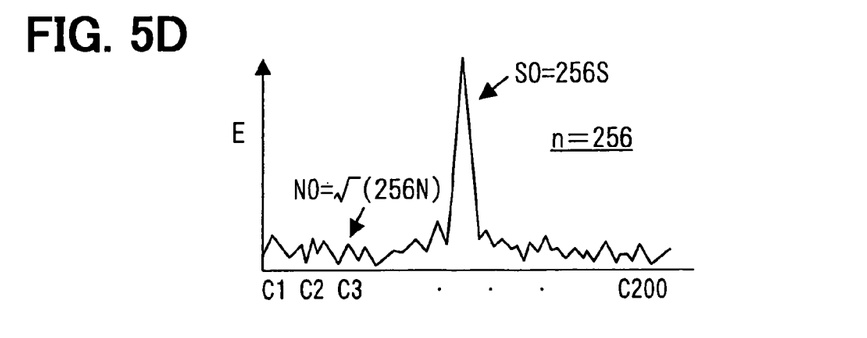

If the laser light is emitted for the second time (n=2), the controller accumulates the electric charges into the respective capacitors C1–C200 in accordance with the intensity of the light reception signals by switching the switches SW1–SW200 to the connected state one after another in a predetermined order at an interval of 10 nsec while 2000 nsec passes as shown in FIG. 5C. Thus, the CPU 70 repeatedly performs the integration processing until the laser light is emitted 256 times (n=256).

If the laser light is emitted 256 times and the electric charges corresponding to the intensity of the light reception signals are accumulated respectively in the capacitors C1–C200, the controller switches the switching elements 95a to the disconnected state.

In the case where all the light reception signals of one of the photoreceptive elements PD1–PD15 include a light reception signal component S corresponding to the reflected light reflected by the same reflection object as shown in FIGS. 5B, 5C, electric charges E corresponding to the light reception signal component S appear when the same period elapses after the emission timing of the laser light. Therefore, the electric charge E corresponding to the light reception signal component S0 at the time when the laser has been emitted 256 times becomes a value provided by amplifying the light reception signal component S of each light reception signal by 256 times as shown in FIG. 5D.

Figure 7:
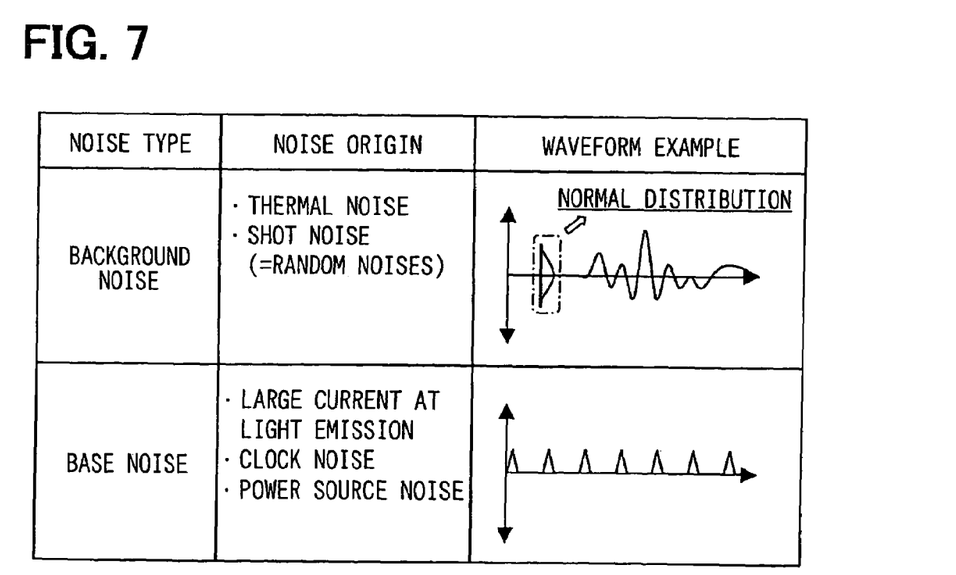
FIG. 7 is a table showing types, origins and waveforms of noises.

A noise component N known as a background noise is superimposed on each light reception signal. As shown in a table of FIG. 7, the background noise is a thermal noise (Johnson noise) caused by a resistor or a shot noise caused by a semiconductor. These noises are random noises irrelevant to frequency.

Figure 4:
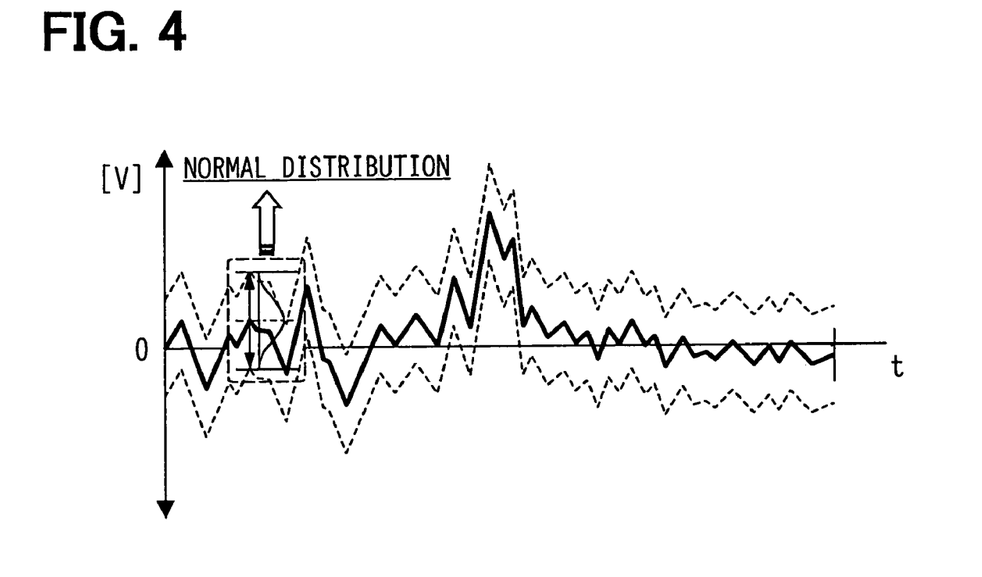
FIG. 4 is a graph showing a waveform of a light reception signal.

Therefore, as shown in FIG. 4, a frequency distribution of the light reception signals superimposed with the background noise becomes a substantially normal distribution. Therefore, even if an electric charge corresponding to a noise component N is accumulated, the electric charge corresponding to the noise component N0 (noise component at the time when the laser light is emitted 256 times) becomes a value provided by amplifying the noise component N by only 16 ($\sqrt{256}$) times as shown in FIG. 5D. Therefore, the reflection object can be sensed at high sensitivity based on the integration signals corresponding to the electric charge E corresponding to the amplified light reception signal component S0.

The controller, after switching all the switching elements 95a to the disconnected state, switches the switching elements 95b corresponding to the photoreceptive elements PD1, PD16 to the connected state. Then, the controller switches the switches SW1–SW200 corresponding to each one of the photoreceptive elements PD1, PD16 to the connected state one after another in a predetermined order at a predetermined time interval (10 nsec). Thus, the controller outputs the integration signals corresponding to the electric charges accumulated in the capacitors C1–C200 to the subtracter 99.

Then, the subtracter 99 eliminates the base noise components from the analog integration signals corresponding to the light reception signals of the photoreceptive element PD1. Then, the A/D converter converts the analog integration signals into digital integration signals, which are output to the CPU 70.

If the digital integration signals corresponding to the photoreceptive element PD1 are output to the CPU 70, the switching element 95b corresponding to the photoreceptive element PD1 is switched to the disconnected state and the switching element 95b corresponding to the photoreceptive element PD2 is switched to the connected state. Then, the controller switches the switches SW1–SW200 corresponding to each one of the photoreceptive elements PD2, PD16 to the connected state one after another in a predetermined order at a time interval of 10 nsec. Thus, the controller outputs the integration signals corresponding to the electric charges accumulated in the capacitors C1–C200 to the subtracter 99.

Thereafter, the controller repeats the similar control until the digital integration signals respectively corresponding to the photoreceptive elements PD3–PD15 are output to the CPU 70. Since the capacitors C1–C200 corresponding to the photoreceptive element 16 have the buffer amplifiers, the electric charges accumulated in the capacitors C1–C200 corresponding to the photoreceptive element PD16 are not lost even if the above control is repeatedly performed for the photoreceptive elements PD1–PD15.

The CPU 70 senses the lateral angle θx and the vertical angle θy based on the position of the photoreceptive element outputting a voltage signal equal to or greater than an integration standard value (standard voltage). In an example shown in FIG. 6A, the photoreceptor (photoreceptive elements PD1–PD16 ) receives the reflected light reflected by the reflection object straight in front of the vehicle. The reflected light received by the light reception lens 80 is converged at the photoreceptive element at a position corresponding to an angle (direction) of the reflection object. Therefore, the lateral angle (direction) θx of the reflection object can be sensed based on the position of the photoreceptive element outputting the integration signal equal to or greater than the standard voltage.

Figure 6A:
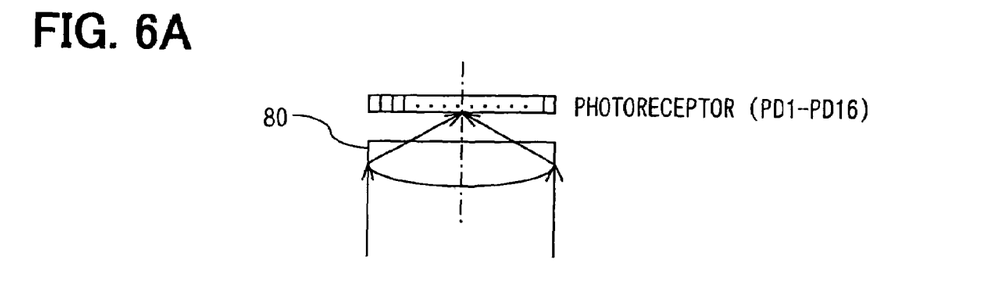
FIGS. 6A and 6B are schematic diagrams showing photoreceptive elements and a light reception lens according to FIG. 1 embodiment.

The position of the photoreceptive element differs in accordance with the height of the reflection object. Therefore, the vertical angle θy of the reflection object can be sensed based on the position of the photoreceptive element outputting the integration signal equal to or greater than the standard voltage.

Figure 6B:
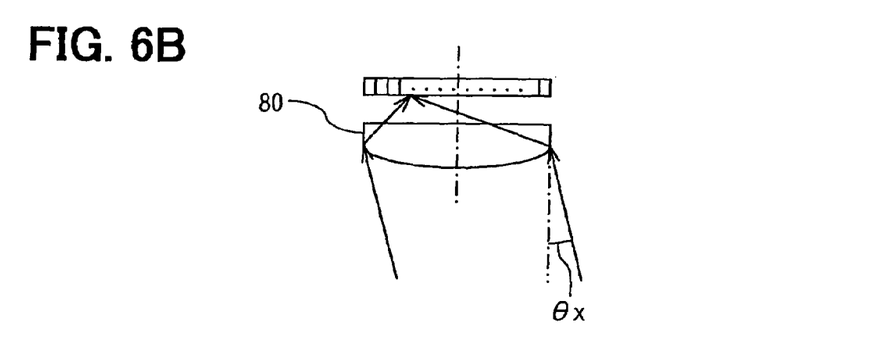

Therefore, the number of the photoreceptive elements should be preferably set in accordance with the angular resolution of the angle along the width direction or the height direction of the vehicle to be sensed. For example, as shown in FIG. 6B, the lateral angle θx of the reflection object can be sensed based on the position where the reflected light is converged. Therefore, by setting the number of the photoreceptive elements in accordance with the angular resolution of the angle along the width direction of the vehicle, the angle of the reflection object along the width direction of the vehicle can be obtained precisely. The similar explanation also applies to the vertical angle θy.

Figure 8:
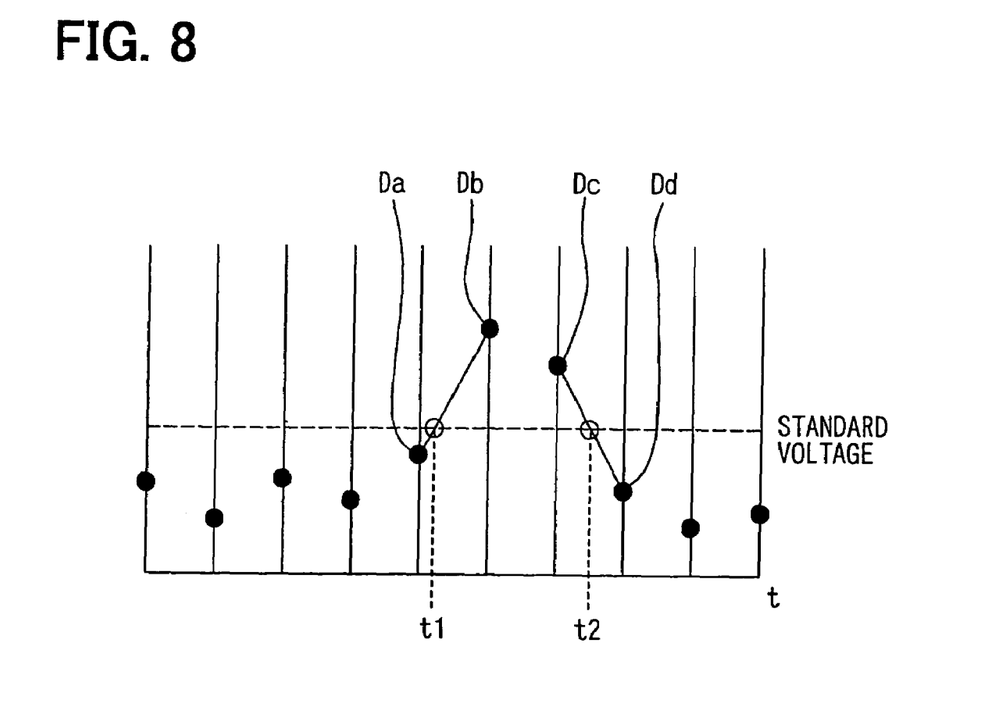
FIG. 8 is a diagram showing linear interpolation processing according to FIG. 1 embodiment.

The CPU 70 compares the integration signals of each photoreceptive element with the standard voltage and senses the reflection object based on the integration signals equal to or greater than the standard voltage. For example, as shown in FIG. 8, each one of the sporadic integration signals of the photoreceptive elements PD1–PD15 is compared with the standard voltage. In the case where the integration signals Db, Dc are greater than the standard voltage as shown in FIG. 8, the result of the comparison is output to an interpolation device (not shown).

The interpolation device performs linear interpolation to obtain rising time t1 and dropping time t2, at which it is presumed that the integration value (value of integration signal) crosses the standard voltage. More specifically, an imaginary line running on the integration value Db exceeding the standard voltage and on another integration value Da obtained immediately before the integration value Db is imagined. Then, time corresponding to an intersection of the imaginary line and the standard voltage is obtained as the rising time t1. Likewise, another imaginary line running on the integration value Dc exceeding the standard voltage and yet another integration value Dd obtained immediately after the integration value Dc is imagined. Then, time corresponding to an intersection of the imaginary line and the standard voltage is obtained as the dropping time t2.

The CPU 70 calculates time when a peak value of the light reception signal component S is generated based on the rising time t1 and the dropping time t2. Then, the CPU 70 calculates a time difference Δt between the time when the laser light is emitted and the time when the peak value is generated.

The CPU 70 calculates the distance from the reflection object based on the time difference Δt. The CPU 70 makes positional data based on the distance and the lateral angle θx and the vertical angle θy of the reflection object. For example, the positional data of the reflection object on an x-y-z orthogonal coordinate system are obtained based on the distance, the lateral angle θx and the vertical angle θy. The origin of the x-y-z orthogonal coordinate system coincides with the center of the laser radar sensor 5, the x-axis coincides with the width direction of the vehicle, and the y-axis coincides with the height direction of the vehicle. Then, the positional data are output to the ECU 3 as distance surveying data.

The ECU 3 recognizes the object based on the distance surveying data provided by the laser radar sensor 5. The ECU 3 performs inter-vehicle control for controlling the vehicle speed V by outputting drive signals to the brake driver 19, the throttle driver 21 and the automatic transmission controller 23 in accordance with conditions of a preceding vehicle obtained from the recognized object. The ECU 3 simultaneously performs alarm determination processing for providing an alarm when the recognized object exists within a predetermined alarm area for a predetermined time. The object is a vehicle running ahead or a vehicle remaining stationary ahead.

The distance surveying data output from the laser radar sensor 5 is transmitted to an object recognition block 43. The object recognition block 43 obtains the central position (X, Y, Z) and the dimensions (W, D, H), i.e., the width W, the depth D and the height H, of the object based on the three-dimension positional data obtained as the distance surveying data.

The object recognition block 43 calculates relative speed (Vx, Vy, Vz) of the object on the basis of the position of the own vehicle, in which the laser radar sensor 5 is mounted, based on a temporal change of the central position (X, Y, Z). The object recognition block 43 recognizes whether the object is a stationary object or a moving object based on the vehicle speed (own vehicle speed) V, which is output by a vehicle speed calculation block 47 based on the sensing value of the vehicle speed sensor 7, and the relative speed (Vx, Vy, Vz). The object that can affect the travel of the own vehicle is selected based on the recognition result and the central position of the object, and the distance to the object is displayed on the distance display 15.

A steering angle calculation block 49 calculates the steering angle St based on the signal output from the steering sensor 27. A yaw rate calculation block 51 calculates the yaw rate Ry based on the signal output from the yaw rate sensor 28. A curvature radius calculation block 57 calculates a curvature radius R based on the vehicle speed V output by the vehicle speed calculation block 47, the steering angle St output by the steering angle calculation block 49 and the yaw rate Ry output by the yaw rate calculation block 51.

The object recognition block 43 determines a possibility that the object is a vehicle or a possibility that the vehicle as the object is running on the same lane as the lane on which the own vehicle is running based on the curvature radius R, the central position coordinates (X, Z) and the like. A sensor abnormality sensing block 44 determines whether the data obtained by the object recognition block 43 are in an abnormal range. If the data are in the abnormal range, the sensor abnormality display 17 displays a notification of the abnormality.

A preceding vehicle determination block 53 selects a preceding vehicle based on various data obtained from the object recognition block 43 and calculates the distance Z along the z-axis and the relative speed Vz with respect to the preceding vehicle. In the alarm determination, an inter-vehicle control and alarm determination block 55 determines whether the alarm should be provided, based on the distance Z, the relative speed Vz, the setting of the cruise control switch 26, a pressed state of the brake switch 9, the opening degree THR of the throttle valve output by the throttle opening degree sensor 11 and the sensitivity setting value of the alarm sensitivity setter 25. If it is determined that the alarm is necessary, the inter-vehicle control and alarm determination block 55 outputs an alarm generation signal to the alarm generator 13. In cruise control determination, the inter-vehicle control and alarm determination block 55 determines the contents of the vehicle speed control, based on the distance Z, the relative speed Vz, the setting of the cruise control switch 26, the pressed state of the brake switch 9, the opening degree THR of the throttle valve output by the throttle opening degree sensor 11 and the sensitivity setting value of the alarm sensitivity setter 25. If the cruise control is determined, the inter-vehicle control and alarm determination block 55 outputs control signals to the automatic transmission controller 23, the brake driver 19 and the throttle driver 21 to perform necessary control. When these controls are performed, the distance display 15 displays necessary display signals to notify a vehicle driver of the conditions.

Thus, the integrator 93 having the switches SW1–SW200 and the capacitors C1–C200 for each photoreceptive element can perform the integration of the light reception signals output from the multiple photoreceptive elements PD1–PD16 in parallel.

Figure 9:
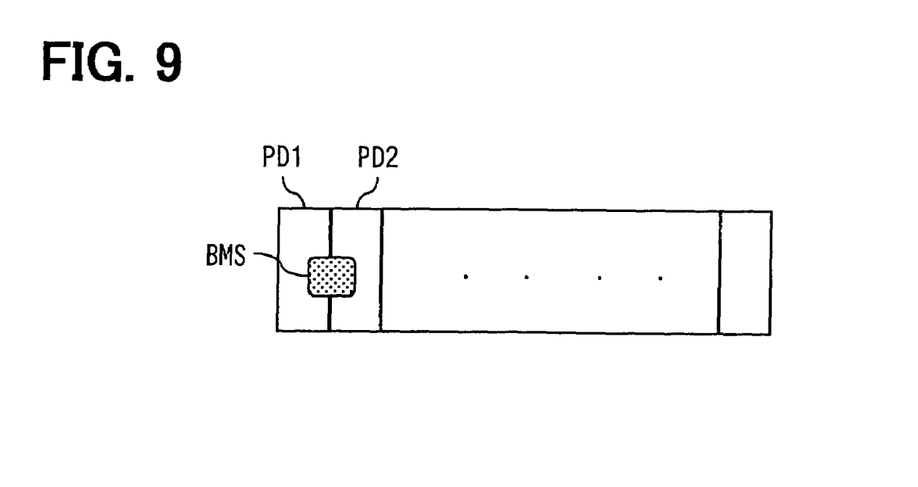
FIG. 9 is a schematic diagram showing the photoreceptive elements according to FIG. 1 embodiment.

The preceding vehicle may have a reflector having high reflection intensity with respect to the laser light on a rear side thereof. A body of the vehicle itself usually has relatively high reflection intensity. In the case where the preceding vehicle is the reflection object, there is a possibility that a reflected light (beam spot: BMS) having high reflection intensity is reflected by the reflector onto two photoreceptive elements (for example, the photoreceptive elements PD1, PD2) as shown in FIG. 9.

The integration signals corresponding to the electric charges provided by the photoreceptive elements PD1, PD2 are higher than the integration signals corresponding to the electric charges provided by the other photoreceptive elements. In such a case, the lateral angle θx of the preceding vehicle cannot be correctly sensed from the position of the photoreceptive elements where the reflected light is converged.

Figure 10:
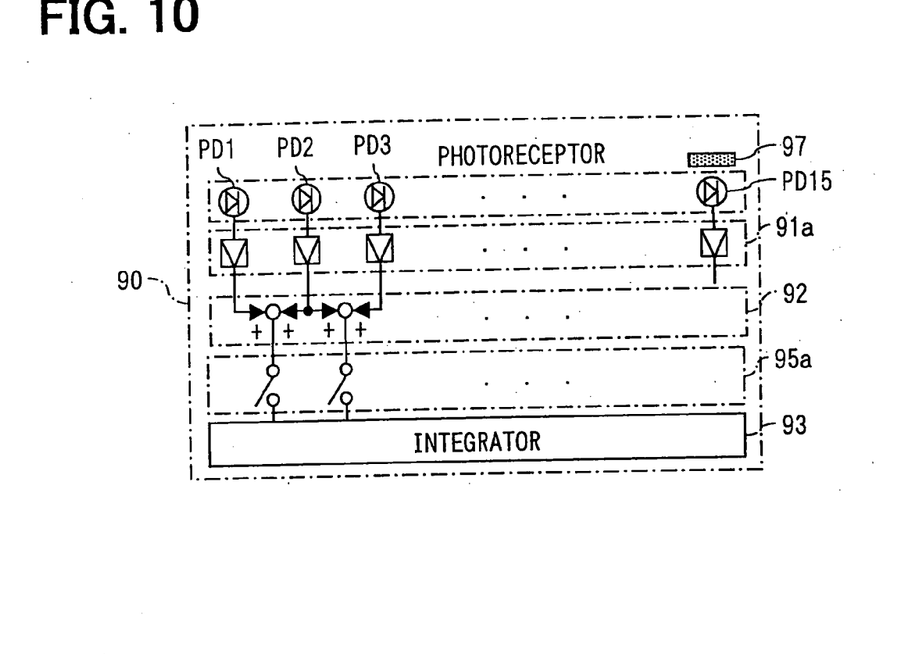
FIG. 10 is a schematic diagram showing a photo IC according to a modified example embodiment of the present invention.

Therefore, as shown in FIG. 10, adders 92 may be provided in the photo IC 90 for adding the light reception signals output from a predetermined number of (two, in this example embodiment) adjacent photoreceptive elements and for outputting the added signal to the integrator 93. The reflection object is sensed based on the integration signals corresponding to the respective adders 92. Thus, the lateral angle θx of the preceding vehicle can be sensed accurately.

The present invention should not be limited to the disclosed embodiments, but may be implemented in many other ways without departing from the spirit of the invention.

What is claimed is:

1. A radar system of a vehicle, the radar system having a light emitter for repeatedly emitting laser light so that the laser light is emitted over a predetermined angular range at least along width direction of the vehicle in each light emission, and a photoreceptor for outputting light reception signals, which are output from photoreceptive elements in accordance with intensity of reflected laser light reflected by a reflection object, the photoreceptive elements being arranged at least along the width direction of the vehicle, the radar system comprising:

an integrator having, for each photoreceptive element, a plurality of switches for switching connection with the photoreceptor, and a plurality of capacitors respectively connected to the switches for accumulating electric charges corresponding to intensity of the light reception signals;

a controller for switching the switches to a connected state one after another in a predetermined order at a predetermined time interval until a predetermined time passes after every emission of the laser light, while keeping the switch, which is not switched to the connected state, at a disconnected state, wherein the controller switches the switches to the connected state one after another in a predetermined order at a predetermined time interval if the laser light is emitted predetermined times, in order to make the integrator output integration signals corresponding to the electric charges accumulated in the capacitors; and a sensor for comparing the integration signals, that correspond to the respective photoreceptive elements and output by the integrator, with a predetermined integration standard value, and for sensing the reflection object based on the integration signals equal to or greater than the integration standard value.

2. The radar system as in claim 1, further comprising:

a light shield in the photoreceptor for shielding at least one of the photoreceptive elements from the light; and an eliminator for eliminating a base noise component superimposed on the light reception signal of the photoreceptive element, which is not shielded by the light shield, based on the light reception signal of the photoreceptive element shielded by the light shield.

3. The radar system as in claim 1, wherein
the sensor senses a distance to the reflection object and an angle of the reflection object along the width direction of the vehicle, the sensor sensing the angle based on a position of the photoreceptive element corresponding to the integration signal equal to or greater than the integration standard value.

4. The radar system as in claim 3, wherein
the number of the photoreceptive elements is set in accordance with necessary angular resolution of the angle along the width direction of the vehicle.

5. A radar system of a vehicle, the radar system having a light emitter for repeatedly emitting laser light so that the laser light is emitted over a predetermined angular range at least along width direction of the vehicle in each light emission, and a photoreceptor for outputting light reception signals, which are output from photoreceptive elements in accordance with intensity of reflected laser light reflected by a reflection object, the photoreceptive elements being arranged at least along the width direction of the vehicle, the radar system comprising:

an adder for adding the light reception signals output from a predetermined number of adjacent photoreceptive elements and for outputting added signals;

an integrator having, for each adder, a plurality of switches for switching connection with the adder, and a plurality of capacitors respectively connected to the switches for accumulating electric charges corresponding to intensity of the added signals;

a controller for switching the switches to a connected state one after another in a predetermined order at a predetermined time interval until a predetermined time passes after every emission of the laser light, while keeping the switch, which is not switched to the connected state, at a disconnected state, wherein the controller switches the switches to the connected state one after another in a predetermined order at a predetermined time interval if the laser light is emitted predetermined times, in order to make the integrator output integration signals corresponding to the electric charges accumulated in the capacitors; and a sensor for comparing the integration signals, that correspond to the respective adders and output by the integrator, with a predetermined integration standard value, and for sensing the reflection object based on the integration signals equal to or greater than the integration standard value.

6. The radar system as in claim 5, further comprising:
a light shield in the photoreceptor for shielding at least one of the photoreceptive elements from the light; and
an eliminator for eliminating a base noise component superimposed on the light reception signal of the photoreceptive element, which is not shielded by the light shield, based on the light reception signal of the photoreceptive element shielded by the light shield.

7. The radar system as in claim 5, wherein
the sensor senses a distance to the reflection object and an angle of the reflection object along the width direction of the vehicle, the sensor sensing the angle based on a position of the photoreceptive element corresponding to the integration signal equal to or greater than the integration standard value.

8. The radar system as in claim 7, wherein
the number of the photoreceptive elements is set in accordance with necessary angular resolution of the angle along the width direction of the vehicle.

* * * * *